US008407886B2

(12) United States Patent
Mitani et al.

(10) Patent No.: US 8,407,886 B2
(45) Date of Patent: Apr. 2, 2013

(54) LEAD WIRE IMPLANTING APPARATUS

(75) Inventors: Takashi Mitani, Mitoyo (JP); Masatoyo Okazaki, Mitoyo (JP)

(73) Assignee: Totankako Co., Ltd., Osaka-shi, Osaka (JP)

( * ) Notice: Subject to any disclaimer, the term of this patent is extended or adjusted under 35 U.S.C. 154(b) by 172 days.

(21) Appl. No.: 12/988,154

(22) PCT Filed: Apr. 16, 2008

(86) PCT No.: PCT/JP2008/057402

§ 371 (c)(1),
(2), (4) Date: Oct. 15, 2010

(87) PCT Pub. No.: WO2009/128143

PCT Pub. Date: Oct. 22, 2009

(65) Prior Publication Data

US 2011/0035931 A1 Feb. 17, 2011

(51) Int. Cl.
*B23P 19/00* (2006.01)
*H01R 43/20* (2006.01)

(52) U.S. Cl. ................ 29/747; 29/748; 29/749; 29/753; 29/755; 29/760; 134/137; 134/149; 259/903

(58) Field of Classification Search .................... 29/605, 29/606, 747, 748, 749, 753, 755, 759, 760, 29/854, 857, 863, 876, 872, 884; 269/903; 134/137, 149
See application file for complete search history.

(56) References Cited

U.S. PATENT DOCUMENTS 3,807,311 A * 4/1974 Plasser et al. .................. 104/12
2003/0222376 A1 12/2003 Imatomi et al.
2006/0078456 A1 4/2006 Imatomi et al.
2006/0219277 A1* 10/2006 Nakamura et al. ............ 134/137
2006/0228997 A1* 10/2006 Chida et al. ..................... 451/11

FOREIGN PATENT DOCUMENTS

CN 1462659 A 12/2003
JP 57-000044 A 1/1982
JP 62-171434 A 7/1987
JP 2000-48927 A 2/2000
JP 2004-001301 A 1/2004

OTHER PUBLICATIONS

International Search Report of PCT/JP2008/057402, mailing date Jul. 15, 2008.

(Continued)

*Primary Examiner* — Paul D Kim
(74) *Attorney, Agent, or Firm* — Westerman, Hattori, Daniels & Adrian LLP

(57) ABSTRACT

A lead wire implanting apparatus is provided that can fabricate high-quality brushes that are without variations in implanting height and implanting strength and free from cracks and that can make the reproducibility of set values better and improve the workability in setup changing. The lead wire implanting apparatus has a tamping member and a storing cup for storing conductive metal powder, for implanting and fixing a lead wire to a brush main body by performing a tamping action of the tamping member a predetermined number of times. The apparatus has a linear-type servo motor serving as a drive source for driving the tamping member in vertical directions, a first position detector for detecting a shift position of the tamping member, and a controller device for controlling the linear-type servo motor based on detected information by the first position detector to cause the tamping member to perform a predetermined tamping action.

19 Claims, 11 Drawing Sheets

OTHER PUBLICATIONS

Japanese Office Action dated Sep. 12, 2012, issued in corresponding Japanese Patent Application No. 2010-508058, with English translation (6 pages).

Chinese Office Action dated Jul. 27, 2012, issued in corresponding Chinese Patent Application No. 200880125058.1, with English translation (12 pages).

* cited by examiner

LEAD WIRE IMPLANTING APPARATUS

TECHNICAL FIELD

The present invention relates to a lead wire implanting apparatus and a lead wire implanting method for implanting and fixing a lead wire in a brush main body, by inserting one end of the lead wire into an implanting hole of the brush main body, thereafter dropping conductive metal powder around the lead wire inserted in the implanting hole, and lowering a tamping member to tamp and press-fit the conductive metal powder.

BACKGROUND ART

Conventional lead wire implanting apparatuses have used a tamping member commonly referred to as a tubular (see, for example, Patent Document 1). An air cylinder has been commonly used as the drive source of the tamping member. A conventional example is described with reference to FIGS. 11 and 12. An air cylinder 101 is provided as the drive source of a tamping member 100. The tamping member 100, through which a lead wire 102 is inserted, is supported by and fixed to a support plate 103. This support plate 103 is capable of being driven upward by the air cylinder 101. The support plate 103 is also provided with a lowering spring 104.

When implanting a lead wire, first, the entire implanting unit is lowered (see FIGS. 12(*a*) and 12(*b*)), and the lead wire 102 is pressed against the bottom of a fitting hole 106 provided in the upper end of a brush main body 105 (FIG. 12(*b*)). Thereafter, the tamping member 100 is pushed upward by the air cylinder 101, and stopped by a mechanical stop at a position upward of a bottom hole 108 of an accommodating cup 107 for accommodating copper powder 109 to let the copper powder 109 free-fall from the space formed in the bottom hole 108 of accommodating cup 107 so that the copper powder 109 enters the fitting hole 106 of the brush main body 105 (FIG. 12(*c*)). Thereafter, the air in the air cylinder 101 is purged, and the tamping member 100 is lowered by the force of the lowering spring 104 to press-fit the copper powder 109 (FIG. 12(*d*)). Then, the steps of FIG. 12(*c*) and FIG. 12(*d*) are repeated several times, and when the position of the tamping member 100 reaches a position sensor 110, the implanting is finished.

[Patent Document 1] Japanese Published Unexamined Patent Application No. 62-171434

DISCLOSURE OF THE INVENTION

Problems to be Solved by the Invention

With the conventional example, tamping of copper powder is possible when implanting a lead wire. However, since the tamping action of the tamping member is caused by the use of the air cylinder and the lowering spring, the following problems arise.

(1) Since tamping speed, tamping pressure, etc. cannot be adjusted finely, the great variations occur in implanting height and implanting strength. In the worst case, cracks may develop in the brush. Thus, the brush fabricated according to the conventional example has problems in quality.

(2) When implanting the lead wire, the upper limit position and the implanting height position of the tamping member vary depending on the shape of the product, the material of the brush, the type of the copper powder, and the like. For this reason, the positions are mechanically adjusted when changing setup, but the reproducibility thereof is poor. Consequently, fine adjustments are necessary every time, leading to poor workability.

Accordingly, there has been a demand for a lead wire implanting apparatus that can reduce variations in implanting height and implanting strength, that can fabricate high-quality brushes free from cracks, and moreover, that can improve the reproducibility of setting values to enhance the workability in setup changing.

The present invention has been accomplished in view of the foregoing circumstances, and it is an object of the invention to provide a lead wire implanting apparatus that can reduce variations in implanting height and implanting strength, that can fabricate high-quality brushes free from cracks, and moreover, that can improve the reproducibility of setting values to enhance the workability in setup changing.

It is another object of the invention to provide a lead wire implanting method that can reduce variations in implanting height and implanting strength and that can fabricate high-quality brushes free from cracks.

Means for Solving the Problems

In order to accomplish the foregoing objects, the present invention provides a lead wire implanting apparatus comprising: a vertically movable tamping member having a through hole for inserting therethrough a lead wire to be connected to a brush main body; and a storing cup for storing conductive metal powder (such as copper powder, iron powder, and copper plated powder) and having, in a bottom portion thereof, an opening for inserting through the tamping member, the lead wire implanting apparatus configured to: arrange the brush main body at a position below the storing cup so that an implanting hole for implanting therein one end of the lead wire faces upward; after inserting one end of the lead wire into the implanting hole of the brush main body, elevate the tamping member to a first elevation position at which a lower end face of the tamping member is above the opening of the storing cup and drop the conductive metal powder around the lead wire inserted in the implanting hole; subsequently lower the tamping member from the first elevation position to tamp and press-fit the conductive metal powder; and perform the tamping operation of the tamping member a predetermined number of times, whereby the brush main body is implanted and fixed to the lead wire, the lead wire implanting apparatus characterized by comprising: a first servo motor serving as a drive source for driving the tamping member in vertical directions; a first position detector for detecting a shift position of the tamping member; and controlling means for controlling the first servo motor based on detected information from the first position detector so as to cause the tamping member to perform a predetermined tamping operation.

It becomes possible to control the tamping action by the tamping member with high precision by using a servo motor as the drive source for driving the tamping member, providing the first position detector for detecting the shift position of the tamping member, and controlling the first servo motor so that the tamping member performs a predetermined tamping action based on the detected information from the first position detector as described above. As a result, variations in implanting height and implanting strength can be reduce, and high-quality brushes free from cracks can be fabricated. In the present invention, the "brush main body" is not limited to the one made of a carbonaceous material, but may be made of other materials.

Moreover, by employing the servo control configuration, the operations are controlled digitally, so the reproducibility of set values is made better. As a result, the workability in changing setup is improved.

In the lead wire implanting apparatus according to the present invention, it is preferable that the controlling means servo-control at least a tamping speed and a tamping pressure so as to match preset target values so that the tamping member performs the predetermined tamping operation.

By servo-controlling at least the tamping speed and the tamping pressure, it becomes possible to fabricate high-quality brushes without variations in implanting height and implanting strength and free from cracks.

In the present invention, it is possible that, if it is detected by the detected information by the first position detector that the height position of the tamping member at the time of completing tamping of the conductive metal powder reaches a preset height position before the number of times of tamping reaches a predetermined number of times, the controlling means may change the elevation position of the tamping member to a second elevation position that is lower than the first elevation position in order to reduce the amount of the conductive metal powder to be dropped, and thereafter may control the tamping action with the second elevation position until the number of times of tamping reaches a predetermined number of times.

The just-described configuration makes it possible to perform an optimum implanting height adjustment according to the product by reducing the amount of the conductive metal powder to be dropped when a predetermined tamping position is approaching.

In the present invention, it is also possible that the controlling means may obtain a difference between an actually measured value of an implanting height indicating the height position of the conductive metal powder surface when completing tamping and a preset target value, may correct the first elevation position of the tamping member based on the difference, and may control a tamping operation for a product to be processed next with the corrected first elevation position.

With the just-described configuration, it is possible to change the amount of the conductive metal powder to be dropped during continuous operation. Accordingly, the lead wire implanting apparatus can perform implanting height adjustment during continuous operation, so that it can ensure uniformity and high quality of the products.

The servo motor may be either a linear-type servo motor or a rotation-type servo motor. In the case of the linear-type servo motor, it may be either a vertically-mounted linear-type servo motor or a horizontally-mounted linear-type servo motor.

In the case of the vertically-mounted linear-type servo motor, it is preferable that the apparatus further comprise a linear-type servo motor initial levitating device for levitating a mover of the servo motor during an initial state that is before power to the linear-type servo motor is turned on. When the linear-type servo motor is used in a vertically mounted state, it is necessary to prevent the motor from dropping when the power is turned off and also to have a structure in which the motor can move vertically freely at the start up. For this purpose, it is common to provide a balancer or a spring. However, these structures are poor in response in order to follow the implanting movement of the present apparatus (specifically, several times of upward and downward movements per second). To solve such a problem, it is preferable to provide the linear motor initial levitating device.

It is also possible that the lead wire implanting apparatus further comprise: a second servo motor serving as a drive source for driving an entire implanting unit including the tamping member and the storing cup in vertical directions; and a second position detector for detecting a shift position of the implanting unit, and wherein: the controlling means controls the second servo motor based on detected information from the second position detector in addition to the controlling of the first servo motor, to position the implanting unit to a preset lead wire cutting elevation position.

By using a servo motor as the drive source for driving the entire implanting unit in vertical directions, cutting length adjustment becomes easy in the lead wire cutting process after completing the implanting of the lead wire.

The present invention also provides a method of implanting a lead wire, including: using a vertically movable tamping member having a through hole for inserting therethrough a lead wire to be connected to a brush main body, and a storing cup for storing conductive metal powder and having, in a bottom portion thereof, an opening for inserting therethrough the tamping member; after inserting one end of the lead wire into an implanting hole of the brush main body, dropping the conductive metal powder around the lead wire inserted in the implanting hole; and tamping the conductive metal powder by the tamping member, to implant and fix the lead wire to the brush main body, the method characterized by comprising: a first step of elevating the tamping member to a first elevation position at which a lower end face of the tamping member is above the opening of the storing cup, and dropping the conductive metal powder in the storing cup through the opening into the implanting hole; a second step of lowering the tamping member from the first elevation position at a predetermined tamping speed; a third step of tamping and press-fitting the conductive metal powder in the implanting hole at a predetermined tamping pressure by the tamping member; and a fourth step of repeating the first step to the third step a predetermined number of times.

Here, the term “predetermined tamping speed” means a tamping speed as a preset target value. The term “predetermined tamping pressure” means a tamping pressure as a preset target value. Tamping accuracy is improved by causing the tamping action to be performed at a predetermined tamping speed and a predetermined tamping pressure as described above. Therefore, it becomes possible to fabricate high-quality brushes without variations in implanting height and implanting strength and free from cracks.

It is desirable that in the lead wire implanting method according to the present invention, the fourth step comprise the steps of: detecting whether or not the height position of the tamping member at the time of completing tamping of the conductive metal powder reaches a preset height position before the number of times of tamping reaches a predetermined number of times; and changing the elevation position of the tamping member to a second elevation position that is lower than the first elevation position, if it is detected that the preset height position is reached in the step of detecting. With the just-described configuration, it becomes possible to perform an optimum implanting height adjustment according to the product by reducing the amount of the conductive metal powder to be dropped when a predetermined tamping position is approaching.

It is desirable that the method of implanting a lead wire according to the invention be configured to further comprise a fifth step of, if tamping is completed, obtaining a difference between an actually measured value of an implanting height indicating the height position of the conductive metal powder surface at the time of completing tamping and a preset target value thereof, and correcting the first elevation position of the tamping member based on the difference, for the tamping for a product to be processed next. This configuration makes it possible to change the amount of the conductive metal powder to be dropped during continuous operation. As a result, implanting height adjustment is possible during continuous operation, so that it is possible to ensure uniformity and high quality of the products.

Advantages of the Invention

The lead wire implanting apparatus according to the present invention can reduce variations in implanting height and implanting strength and fabricate high-quality carbon brushes free from cracks by employing servo controlling using a servo motor for the tamping action by the tamping member.

Moreover, by employing the servo control configuration, the operations are controlled digitally, so the reproducibility of set values is made better. As a result, the workability in setup changing is improved.

Furthermore, the lead wire implanting method according to the present invention achieves improvements in tamping accuracy by causing the tamping action to be performed at a predetermined tamping speed and a predetermined tamping pressure. Therefore, it becomes possible to fabricate high-quality brushes that are without variations in implanting height and implanting strength and free from cracks.

BEST MODE FOR CARRYING OUT THE INVENTION

Hereinbelow, the present invention will be described based on the preferred embodiments. It should be noted that the present invention is not limited to the following embodiments.

(Structure of the Lead Wire Implanting Apparatus)

FIG. 1 is a perspective view of a lead wire implanting apparatus according to the present invention. The lead wire implanting apparatus is configured to comprise an implanting device unit 1 and a controller device 2 for controlling the operations of the implanting device unit 1 and so forth. The implanting device unit 1 has a stationary plate 3, a retaining member 5 for retaining a lead wire 4, a tamping member 6 commonly referred to as a tubular, a linear-type servo motor 7 (corresponding to the first servo motor) serving as a drive source for driving the tamping member 6 in vertical directions, and so forth. The lead wire 4 is disposed so as to be inserted through the retaining member 5 and the tamping member 6 and extended vertically. A brush main body 8 is disposed directly below the tamping member 6. The brush main body 8 is made of a carbonaceous material in the present embodiment. However, the material of the brush main body 8 is not limited thereto in the present invention and other materials may be used. The brush main body 8 is arranged so that an implanting hole 9 in which one end of the lead wire 4 is to be implanted faces upward.

The linear-type servo motor 7 used in the present embodiment is a vertical mounted type. The linear-type servo motor 7 comprises a linear motor coil unit 7*a*, which is a stator, and a linear motor drive unit 7*b*, which is a mover. The linear motor coil unit 7*a* is fixed to the surface of one side of the stationary plate 3. Two supporting members 10*a* and 10*b* extending in a direction perpendicular to the stationary plate 3 are provided on the surface of the other side (the right side surface in FIG. 1) of the stationary plate 3. The retaining member 5 is fixed to the foremost ends of the supporting members 10*a* and 10*b*.

A support plate 11 is disposed below the retaining member 5, and a conductive metal powder tray 12 is disposed below the support plate 11. Hereinbelow, a case in which copper powder is used as the conductive metal powder will be described, but the conductive metal powder is not limited to copper powder. A coupling portion 13 is provided on a portion of the support plate 11 that is near one end side (the right side in FIG. 1) of. The tamping member 6 is attached to the lower end of the coupling portion 13. A storing cup 14 for storing copper powder 50 is provided in the lower face of the copper powder tray 12. This storing cup 15 is formed in an inverted conical shape, and an opening 15 is formed in its bottom portion. The tamping member 6 is inserted through the opening 15. The gap between the outer peripheral surface of the tamping member 6 and the inner peripheral surface of the opening 15 is very small so that the copper powder does not leak when the tamping member 6 inserted through the opening 15. On the other hand, when the tamping member 6 rises and a lower end face 6*a* of the tamping member 6 is above the opening 15, the opening 15 is in an open state and the copper powder drops through the opening 15.

The copper powder tray 12 is fixed to a lower part of the stationary plate 3. On the other hand, the support plate 11 is fixed to a lower flange 17 of the linear motor drive unit 7*b* through a rectangular through hole 16 of the stationary plate 3. Accordingly, the tamping member 6 is coupled to the linear motor drive unit 7*b* via the support plate 11 and the lower flange 17. As a result, the tamping member 6 is driven in vertical directions because of the vertical movements of the linear motor drive unit 7*b*.

A linear motor initial levitating device 20 is disposed below the lower flange 17. The linear motor drive unit 7*b* is put in a levitated state by the linear motor initial levitating device 20 in the initial state that is before the power is turned on. After the power is turned on, the linear motor initial levitating device 20 is automatically removed.

The reason why the linear motor initial levitating device 20 is used is as follows. When the linear-type servo motor 7 is used in a vertically mounted state as in the present embodiment, it is necessary to prevent the motor from dropping when the power is turned off and also to have a structure in which the motor can move vertically freely at the start up. For this purpose, it is common to provide a balancer or a spring. A common structure of the vertical mount configuration will be described in detail below. As illustrated in FIG. 2(2), one end of a wire 63 is fixed to a fitting portion 61 of the linear motor drive unit 7*b*, while the other end of the wire 63 is fixed to a weight 60 via a pulley 62. Alternatively, as illustrated in FIG. 2(3), one end of the wire 63 is fixed to the fitting portion 61 of the linear motor drive unit 7*b*, while the other end of the wire 63 is fixed to the upper end of a spring 64 via the pulley 62 and the lower end of the spring 64 is fixed to a fixed position.

The above-described structures are poor in response in order to follow the implanting movement of the present apparatus (specifically, several times of upward and downward movements per second). In view of that, the structure in which the linear motor initial levitating device 20 is provided is employed as a way of eliminating the balancer and the spring (FIG. 2(1)). The linear motor initial levitating device 20 may be disposed at a side of the linear motor drive unit 7*b* as shown in FIG. 2(1) or below the linear motor drive unit 7*b* as shown in FIG. 1.

In FIG. 1, reference numeral 21 denotes a first position detector for detecting the shift position of the tamping member 6. The first position detector 21 is an optical detector that comprises a linear scale main body 21*a* and a probe head 21*b* having a light emitting element and a light receiving element.

The linear scale main body 21*a* is attached to a surface of the linear motor drive unit 7*b*, and the probe head 21*b* is attached to the stationary plate 3. The position information associated with the movement of the tamping member 6 is detected by the probe head 21*b* and is transmitted to the controller device 2. The first position detector 21 is not limited to the optical detector but may be a magnetic detector or other types of detectors.

In addition to the above-described components, the lead wire implanting apparatus according to the present invention has a second servo motor 22 (see FIG. 3) serving as the drive source for driving the entire implanting device unit 1 in vertical directions, a second position detector 23 (see FIG. 3) for detecting the shift position of the implanting device unit 1, a lead wire cutter 24 (see FIG. 3) for cutting the lead wire, and so forth.

(Electrical Configuration of the Lead Wire Implanting Apparatus)

FIG. 3 is a block diagram illustrating the electrical configuration of the lead wire implanting apparatus. The controller device 2 comprises a CPU 25, a ROM 26 for storing system programs and the like, and a RAM 27 for storing target set values required for the lead wire implanting process operation. The controller device 2 has an input means 28, including a numeric keypad and character keys. Setting of the target values necessary for lead wire implanting process operation is carried out by the input means 28. The target values that are input by the input means 28 is stored in a predetermined region of the RAM 27. The detected information from the first position detector 21 and the detected information from the second position detector 23 are supplied to the controller device 2.

The controller device 2 controls the linear-type servo motor 7 based on the detected information from the first position detector 21. Thereby, the tamping member 6 is controlled so as to perform a predetermined tamping action according to the target set values with high precision. The controller device 2 also controls the second servo motor 22 based on the detected information from the second position detector 23. Thereby, driving of the implanting device unit 1 in vertical directions can be controlled with high precision. The controller device 2 further controls driving of the retaining member 5 and the lead wire cutter 24.

(Implanting Operation of the Lead Wire Implanting Apparatus)

FIGS. 4 and 5 are flow-charts illustrating an implanting operation of the lead wire implanting apparatus. First, before starting up the lead wire implanting apparatus, predetermined target values necessary for the tamping action are set and input by operating the input means. Examples of the target set values include a gap between the implanting device unit 1 and the upper face of the brush main body 8, a first elevation position, a copper powder dropping time, a tamping speed, a tamping pressure, number of times of tamping, compressing time, a predetermined position for elevation position change, and a second elevation position. Here, the first elevation position means an elevation end position of the tamping member 6. The tamping speed means the speed of the tamping member 6 at the time when it is lowered from the first elevation position. The tamping pressure means the force by which the tamping member 6 lowers and compresses the copper powder in the implanting hole 9. The compressing time means the time for which the tamping member 6 compresses the copper powder in the implanting hole 9. The predetermined position for elevation position change means the tamping position for changing the elevation end position of the tamping member 6 into the second elevation position. The second elevation position means the elevation end position of the tamping member 6 to be changed from the first elevation position when the tamping member 6 reaches the predetermined position for elevation position change.

Next, the linear motor initial levitating device 20 is started up before turning on the power of the lead wire implanting apparatus to put the linear motor drive unit 7*b* in a levitated state so that the linear motor drive unit 7*b* can move in vertical directions. Next, the power is turned on, and an optimum power factor position (zero point) is established. Once the optimum power factor position is set, the balancer is unnecessary anymore. So, the linear motor initial levitating device 20 is automatically removed.

Next, the following tamping operation process is performed.

First, in step S1, the retaining member 5 retains the lead wire 4. Next, the process proceeds to step S2, in which the entirety of the implanting device unit 1 is lowered to a position at which the gap between the implanting device unit 1 and the upper face of the brush main body 8 reaches the target value (FIGS. 6(*a*) and 6(*b*)). Next, in step S3, the retaining condition of the lead wire 4 by the retaining member 5 is released, and the entirety of the implanting device unit 1 is elevated so that the lead wire 4 is left at the bottom of the implanting hole 9 (FIG. 6(*b*)). Then, the process proceeds to step S4, in which the tamping member 6 is elevated to the first elevation position (FIG. 6(*c*)). Thereby, the state of the opening 15 of the storing cup 14 is turned from the closed state by the tamping member 6 to an open state, so that the copper powder 50 stored in the storing cup 14 drops through the opening 15. Then, the copper powder 50 drops around the lead wire 4 that is inserted in the implanting hole 9. Then, in step S5, the tamping member 6 is lowered at a predetermined speed (tamping speed). Thereby, the tamping member 6 that has been lowered at the tamping speed makes contact with the copper powder 50 and thereafter compresses the copper powder 50 for a predetermined time (compressing time) while it keeps a predetermined tamping pressure for compressing the copper powder 50 (FIG. 6(*d*)).

Next, the process proceeds to step S6, in which whether or not the tamping member 6 has reached a predetermined change position. If the tamping member 6 has not reached the predetermined change position, the process returns to step S4. Then, a routine of step S4→step S5→step S6→step S4 is repeated, and if the tamping member 6 has reached the predetermined change position, the process moves from step S6 to step S7, in which the elevation position of the tamping member 6 is changed into a second elevation position, which is lower than the first elevation position. Next, in step S8, the tamping member 6 is elevated to the second elevation position. Thereby, the amount of the copper powder dropped is reduced.

Next, in step S9, the tamping member 6 is lowered at a predetermined speed (tamping speed). Thereby, the tamping member 6 that has been lowered at the tamping speed makes contact with the copper powder 50 and thereafter compresses the copper powder 50 for a predetermined time (compressing time) while it keeps a predetermined tamping pressure for compressing the copper powder 50. Next, in step S10, it is determined whether or not a predetermined number of times of tamping is reached, and if the predetermined number of times of tamping has not yet reached, the process returns to step S8. Then, a routine of step S8→step S9→step S10→step S8 is repeated, and if the predetermined number of times of tamping has reached, the process moves from step S10 to step S11, and the tamping process is stopped.

Thus, if it is detected, by the detected information by the first position detector, that the tamping member 6 has reached a predetermined height position before the number of times of tamping reaches the predetermined number of times, the controller device 2 changes the elevation position of the tamping member 6 into the second elevation position, which is lower than the first elevation position, in order to reduce the amount of the copper powder to be dropped, and thereafter the tamping action is carried out with the second elevation position until the number of times of tamping reaches a predetermined number of times. This makes it possible to adjust the implanting height by reducing the amount of the copper powder dropped when a predetermined tamping position is approaching.

Next, in step S12, the first elevation position is automatically corrected. Specifically, a difference is obtained between an actually measured value of the implanting height indicating the height position of the copper powder surface at the time of completing tamping and a preset target value, and the first elevation position of the tamping member 6 is corrected based on the difference. Then, the tamping action for a product to be processed next is controlled with the corrected first elevation position. One example of the automatic correction of the first elevation position is as follows. If the mean value of the implanting height of the first to tenth products is higher than the target value by 1 mm or greater, the elevation end position (the first elevation position) of the tamping member 6 is lowered by 0.2 mm when tamping the product to be processed next, in order to reduce the amount of the copper powder to be dropped. If the mean value is higher than the target value by 0.5 mm or greater, the elevation end position (the first elevation position) of the tamping member 6 is lowered by 0.03 mm. If the difference from the target value is 0.5 mm or less, the elevation end position (the first elevation position) is not changed.

Next, the process moves to step S13, in which the entire implanting unit 1 is elevated to a predetermined height. Specifically, the implanting unit 1 is elevated by driving the second servo motor 22, and the second servo motor 22 is stopped when a predetermined height is detected by the second position detector 23. In this way, the positioning of the elevation stopping position of the implanting device unit 1 is carried out by the second servo motor 22 and the second position detector 23. As a result, the cutting position of the lead wire 4 is set at a desired position, and the cutting length adjustment of the lead wire is made easy.

Next, the process proceeds to step S14, in which the retaining member 5 retains the lead wire 4. Then, in step S15, the lead wire 4 is cut by the lead wire cutter 24. Thereby, a brush in which the lead wire 4 is implanted in the brush main body 8 is fabricated.

Next, in step S16, it is determined whether or not there is a product to be processed next. If there is a product to be processed next, the process returns to step S1, and the tamping process operation is performed. It should be noted that the first elevation position of the tamping member 6 at this time is the corrected first elevation position, which has already been automatically corrected in step S12. Thus, the lead wire implanting apparatus according to the present invention makes it possible to change (proportionally control) the amount of the copper powder to be dropped during continuous operation. Accordingly, the lead wire implanting apparatus is capable of implanting height adjustment during continuous operation, so that it can ensure uniformity and high quality of the products.

If there is no product to be processed next in step S16, the process moves to step S17, in which the retaining member 5 releases the retaining condition of the lead wire 4. Next, the process moves to step S18, in which all the operations of the tamping process are ended.

In this way, the lead wire implanting apparatus according to the present invention can reduce variations in implanting height and implanting strength and fabricate high-quality carbon brushes free from cracks by employing servo controlling using a servo motor for the tamping action by the tamping member. Moreover, by employing the servo control configuration, the operations are controlled digitally, so the reproducibility of set values is made better. As a result, the workability in changing setup is improved.

(Comparison Between the Lead Wire Implanting Apparatus According to the Present Invention and the Conventional Example using Air Cylinder)

To make the advantages of the lead wire implanting apparatus according to the present invention clearer, a comparison with the conventional example using an air cylinder will be described in detail below.

(1) Tamping Speed

In the conventional example, acceleration is applied to the tamping member since the tamping member is lowered by spring tension, and the speed at the bottom of the hole and the speed above the hole are different because the shifting distance is different. In contrast, with the present invention, the tamping member can descend at a constant speed because of the servo motor.

(2) Tamping Pressure

In the conventional example, the tamping speed (acceleration) at the bottom of the hole and the tamping speed above the hole are different, so the pressure varies. In contrast, in the present invention, the tamping member can be lowered at a constant speed and a constant pressure, so the pressure is constant even when the tamping position changes.

(3) Tamping Position

In the conventional example, tamping is performed to a predetermined height, but the amount of copper powder to be dropped cannot be controlled since the gap in the bottom hole of the copper powder storing cup is invariable. In contrast, in the present invention, the gap in the bottom hole (the opening 15) of the copper powder storing cup can be changed to a desired gap using the position detector. In particular, the height adjustment is possible by narrowing the gap in the bottom hole (the opening 15) of the copper powder storing cup to reduce the amount of copper powder dropped when a predetermined tamping position is approaching.

(4) Crack

In the conventional example, the pressure is not constant since the tamping member is lowered by spring tension, and when the impact is large, cracks develop. In contrast, in the present invention, the compression is conducted at a constant speed and a constant pressure at all times, so the cracks are prevented.

(5) Reproducibility of Set Values

The upper limit position and the implanting height position of the tamping member vary depending on the shape of the product, the material of the brush, the type of the copper powder, and the like. For this reason, the positions are mechanically adjusted when changing setup in the conventional example, but the reproducibility is poor. So, fine adjustments are necessary every time. In contrast, in the present invention, the set values can be stored digitally, so setup changing can be carried out smoothly.

(6) Lead Wire Length Adjustment Time

When the implanting is completed, the lead wire is cut. In the conventional example, the cutting length adjustment is performed by a stopper while elevating the unit, so it takes a long time for the adjustment. In contrast, in the present invention, the positioning is performed by servo controlling although the unit is elevated likewise, so the adjustment is easier.

(7) Number of Times of Tamping

In the conventional example, the number of times of tamping changes according to the change of the amount of the copper powder to be dropped. In contrast, the present invention can control the number of times of tamping to a desired number.

(8) Controlling of the Amount of the Copper Powder to be Dropped in the Middle of Tamping The conventional example is unable to control the amount of the copper powder to be dropped in the middle of the tamping. In contrast, the present invention is able to control the amount.

Embodiment 2

FIG. 7 is a simplified view illustrating the configuration of a lead wire implanting apparatus according to Embodiment 2. In this Embodiment 2, the linear-type servo motor 7 as the first servo motor is a vertically-mounted linear-type servo motor. This embodiment is the same as the foregoing Embodiment 1 in the respect that a vertically-mounted linear-type servo motor 7 is used. However, in Embodiment 1, the linear-type servo motor 7 as the first servo motor comprises the linear motor coil unit 7*a*, which is a stator, and the linear motor drive unit 7*b*, which is a mover. On the other hand, in Embodiment 2, the linear-type servo motor 7 is configured to comprise the linear motor coil unit 7*a* as the mover and the linear motor drive unit 7*b* as the stator. In other words, in Embodiment 2, the linear motor drive unit 7*b* is fixed, while the linear motor coil unit 7*a* is movable. The linear motor coil unit 7*a* (mover) is fixed to the support plate 11. Accordingly, the tamping member 6 is coupled to the linear motor coil unit 7*a* (the mover) via the support plate 11. As a result, the tamping member 6 is driven in vertical directions because of the vertical movements of the linear motor coil unit 7*a* (the mover). In addition, a longitudinal mounting plate 30 extending vertically is provided on one end (the right side end in FIG. 7) of the support plate 11. The linear scale main body 21*a* is attached to the mounting plate 30. The first position detector 21 is configured to comprise the linear scale main body 21*a* and the probe head 21*b*. With such a configuration, the shift position of the tamping member 6 is detected by the first position detector 21, and based on the detected information by the first position detector 21, the controller device 2 can control driving of the linear-type servo motor 7.

Embodiment 3

FIG. 8 is a simplified view illustrating the configuration of a lead wire implanting apparatus according to Embodiment 3. In this Embodiment 3, the linear-type servo motor 7 as the first servo motor is a horizontally-mounted linear-type servo motor. In the linear-type servo motor 7 in Embodiment 3, the linear motor coil unit 7*a* serves as a mover and the linear motor drive unit 7*b* serves as a stator, as in the foregoing Embodiment 2. In other words, in Embodiment 3, the linear motor drive unit 7*b* is fixed, while the linear motor coil unit 7*a* is movable. The linear motor coil unit 7*a* (the mover) is fixed to a cord 35, such as a wire or a belt. The cord 35 is wound around between a plurality of pulleys 36. In addition, a movable element 37 is fixed to one end (the right side end in FIG. 6) of the support plate 11. This movable element 37 is fixed to the cord 35 and is configured to be freely movable in vertical directions along a guide member 38. Accordingly, the tamping member 6 is coupled to the movable element 37 via the support plate 11. As a result, by the rightward or leftward shift of the linear motor coil unit 7*a* (the mover), the cord 35 moves in the normal rotation direction or the reverse rotation direction, and according to this movement, the movable element 37 moves in vertical directions. Accordingly, the tamping member 6 is also driven in vertical directions. In addition, a longitudinal mounting plate 30 extending vertically is provided on the support plate 11. The linear scale main body 21*a* is attached to the mounting plate 30. The first position detector 21 is configured to comprise the linear scale main body 21*a* and the probe head 21*b*. With such a configuration, the shift position of the tamping member 6 is detected by the first position detector 21, and based on the detected information by the first position detector 21, the controller device 2 can control driving of the linear-type servo motor 7.

Embodiment 4

FIG. 9 is a simplified view illustrating the configuration of a lead wire implanting apparatus according to Embodiment 4. In this Embodiment 4, the linear-type servo motor 7 as the first servo motor is a rotation-type servo motor 7A. By the rotation of the rotation-type servo motor 7A in a normal rotation direction or in a reverse rotation direction, the cord 35 moves in a normal rotation direction or in a reverse rotation direction, and in response to this movement, the movable element 37 moves in vertical directions. Accordingly, the tamping member 6 is also driven in vertical directions. With such a configuration, the shift position of the tamping member 6 is detected by the first position detector 21, and based on the detected information by the first position detector 21, the controller device 2 can control driving of the rotation-type servo motor 7A.

EXAMPLES

Hereinbelow, the present invention will be described in detail by examples. It should be noted that the present invention is in no way limited to the following examples.

Example 1

A lead wire implanting process was performed using the lead wire implanting apparatus according to Embodiment 1 and the conventional lead wire implanting apparatus shown in FIG. 11, to measure implanting height and implanting strength and also observe crack conditions. The results are shown in Table 1. As the experiment condition, the implanting process was conducted for each of 30 samples of brush materials.

Here, the term "implanting height" refers to the height position of the copper powder surface at the time of completing tamping, as shown in FIG. 10, and the term "implanting strength" corresponding to the load required for pulling out the lead wire in the direction indicated by the arrow.

TABLE 1

| | Implanting height (mm) | | Implanting strength (kg) | | Crack condition | |
|---|---|---|---|---|---|---|
| Number of tests | Conv. ex. | Present invention | Conv. ex. | Present invention | Conv. ex. | Present invention |
| 1 | 0.53 | 0.47 | 5.0 | 5.4 | Good | Good |
| 2 | 0.83 | 0.21 | 6.5 | 5.0 | Good | Good |
| 3 | 0.35 | 0.23 | 3.5 | 5.4 | Good | Good |
| 4 | 1.05 | 0.18 | 4.5 | 5.0 | Good | Good |
| 5 | 0.56 | 0.27 | 3.6 | 5.4 | Good | Good |
| 6 | 0.75 | 0.24 | 3.8 | 5.2 | Good | Good |
| 7 | 0.25 | 0.25 | — | 5.4 | Cracks | Good |
| 8 | 0.35 | 0.23 | 5.6 | 5.4 | Good | Good |
| 9 | 0.65 | 0.29 | 5.8 | 5.2 | Good | Good |
| 10 | 0.59 | 0.4 | 4.8 | 5.2 | Good | Good |
| 11 | 0.95 | 0.3 | 6.2 | 5.6 | Good | Good |
| 12 | 0.80 | 0.3 | 5.3 | 5.6 | Good | Good |
| 13 | 0.63 | 0.22 | 5.2 | 5.0 | Good | Good |
| 14 | 0.64 | 0.19 | 5.0 | 5.0 | Good | Good |
| 15 | 0.35 | 0.27 | 5.5 | 5.0 | Good | Good |
| 16 | 0.45 | 0.25 | 5.8 | 5.2 | Good | Good |
| 17 | 0.27 | 0.37 | — | 5.6 | Cracks | Good |
| 18 | 0.62 | 0.38 | 5.7 | 5.8 | Good | Good |
| 19 | 0.85 | 0.5 | 5.5 | 6.0 | Good | Good |
| 20 | 0.95 | 0.53 | 5.0 | 5.8 | Good | Good |
| 21 | 0.46 | 0.22 | 4.8 | 5.3 | Good | Good |
| 22 | 0.62 | 0.22 | 5.2 | 5.2 | Good | Good |
| 23 | 0.35 | 0.46 | 6.1 | 5.8 | Good | Good |
| 24 | 0.83 | 0.26 | 3.8 | 5.0 | Good | Good |
| 25 | 0.65 | 0.25 | 4.9 | 5.0 | Good | Good |
| 26 | 0.45 | 0.25 | 4.2 | 5.0 | Good | Good |
| 27 | 0.83 | 0.46 | 5.1 | 6.0 | Good | Good |
| 28 | 0.67 | 0.3 | 5.0 | 5.4 | Good | Good |
| 29 | 0.55 | 0.23 | 6.1 | 5.6 | Good | Good |
| 30 | 0.57 | 0.38 | 4.6 | 5.8 | Good | Good |
| Maximum | 1.05 | 0.53 | 6.5 | 6.0 | | |
| Minimum | 0.25 | 0.18 | 3.5 | 5.0 | | |
| Difference | 0.8 | 0.35 | 3.0 | 1.0 | | |

(Analysis of the Experiment Results)

It was observed that while the conventional example showed large variations in implanting height and implanting strength, the present invention exhibited lower variations in implanting height and implanting strength. Moreover, while the occurrence of cracks was observed with the conventional example, no occurrence of cracks was found with the present invention. The reason for such results is believed to be that, by employing the servo controlling using a servo motor for the tamping action of the tamping member, it became possible to finely adjust the tamping speed, the tamping pressure, and so forth.

INDUSTRIAL APPLICABILITY

The present invention is applicable to a lead wire implanting apparatus for implanting and fixing a lead wire in a brush main body, by inserting one end of the lead wire into an implanting hole of the brush main body, thereafter dropping conductive metal powder around the lead wire inserted in the implanting hole, and lowering a tamping member to tamp and press-fit the conductive metal powder.

DESCRIPTION OF REFERENCE NUMERALS

Figure 1:
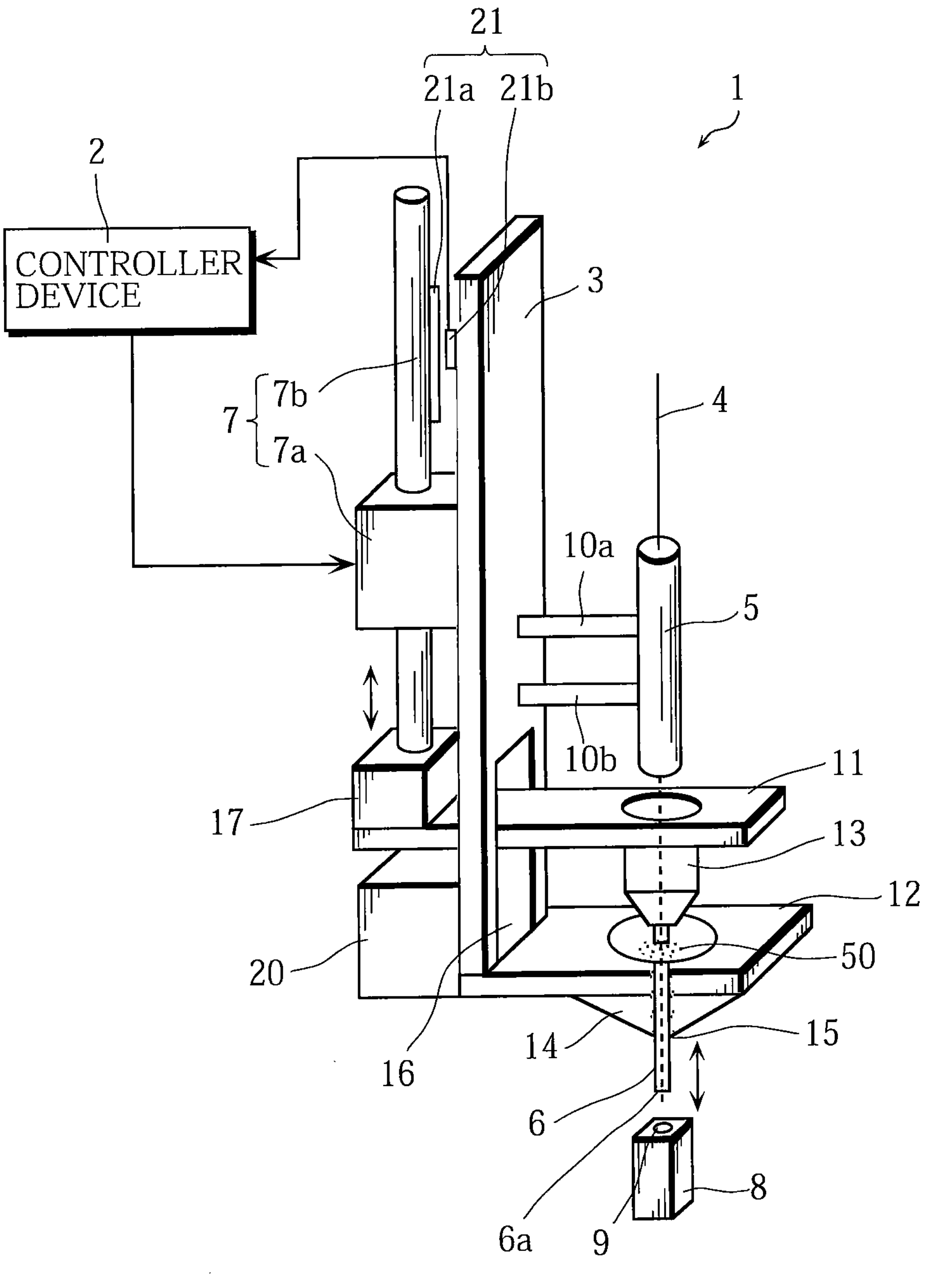
FIG. 1 is a perspective view of a lead wire implanting apparatus according to Embodiment 1.
Figure 2:
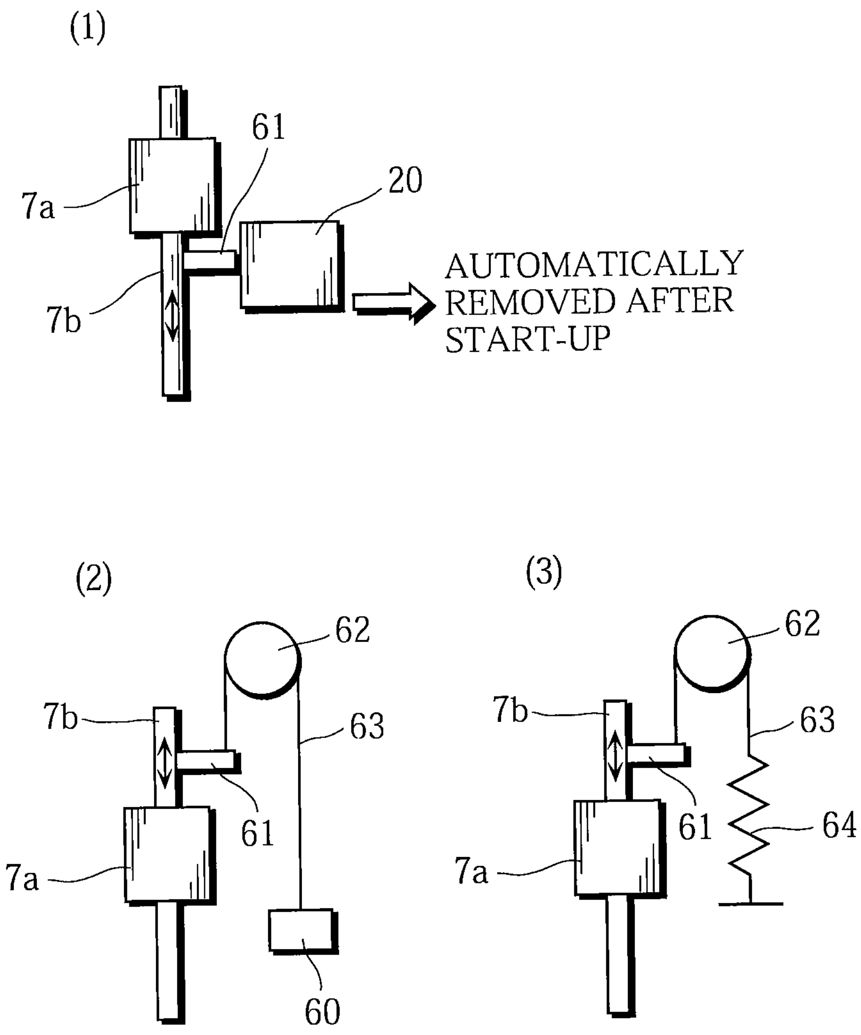
FIG. 2 a view for illustrating the reason for using a linear motor initial levitating device.
Figure 3:
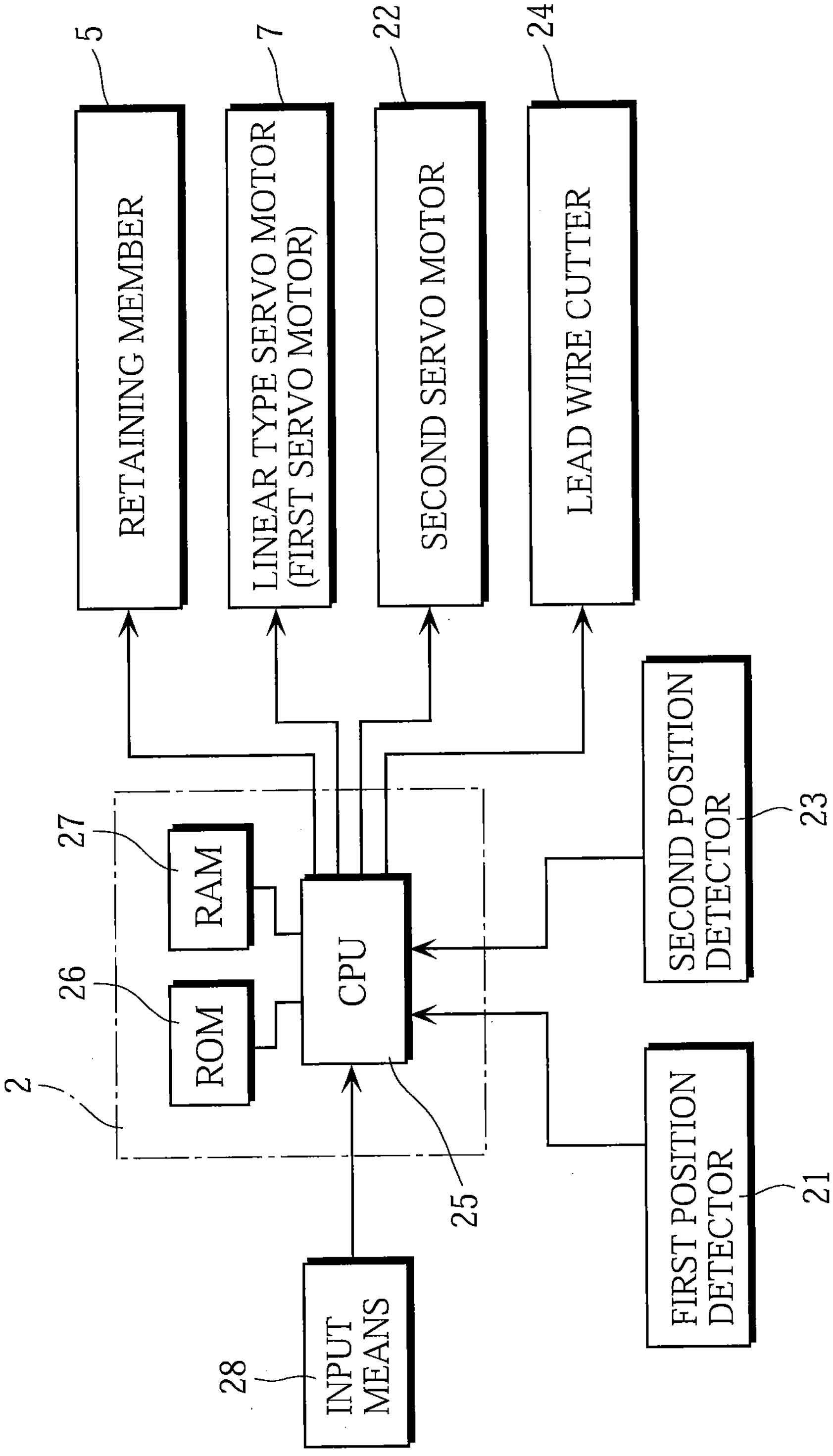
FIG. 3 is a block diagram illustrating the electrical configuration of the lead wire implanting apparatus according to Embodiment 1.
Figure 4:
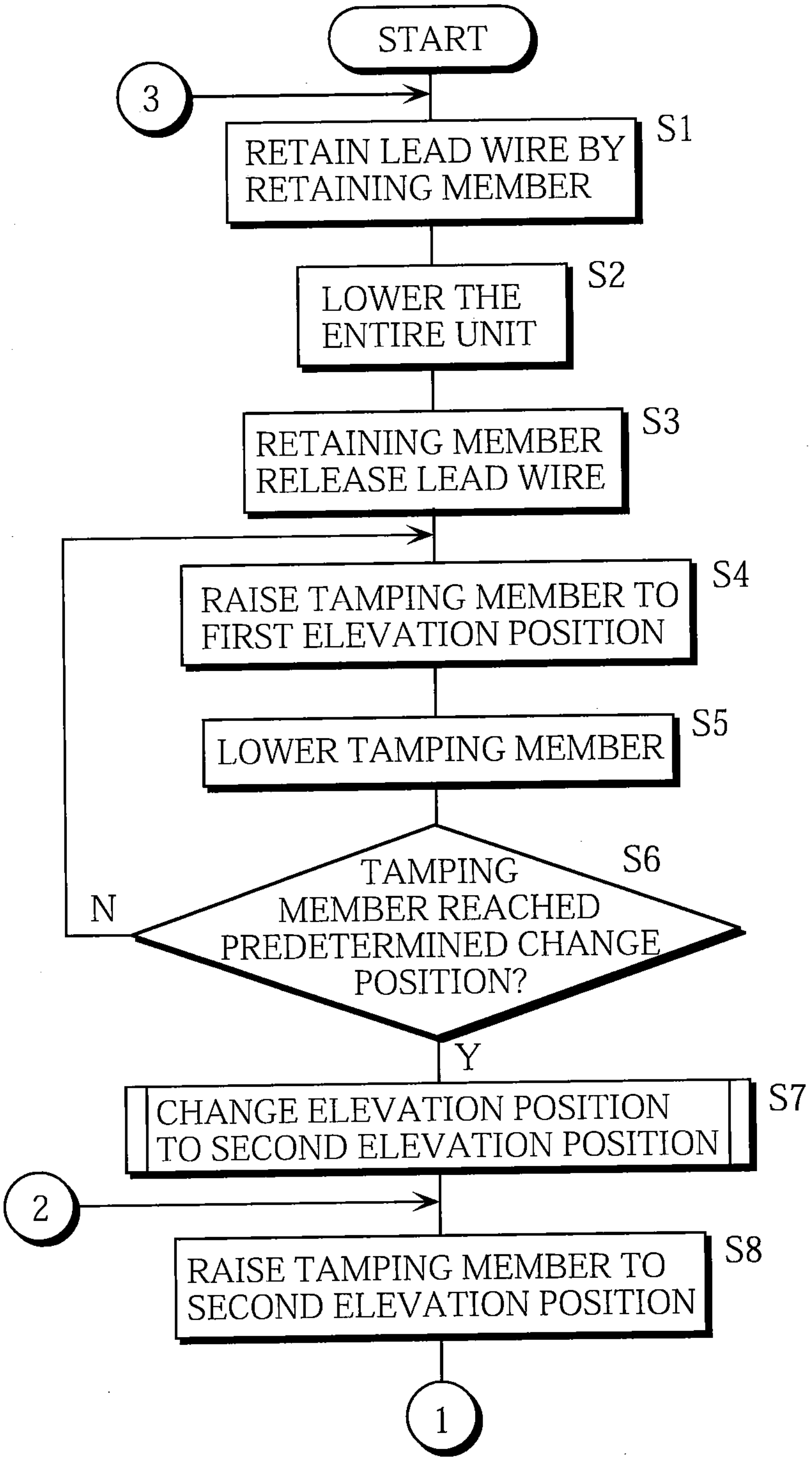
FIG. 4 is a flow-chart for illustrating an implanting operation of the lead wire implanting apparatus according to Embodiment 1.
Figure 5:
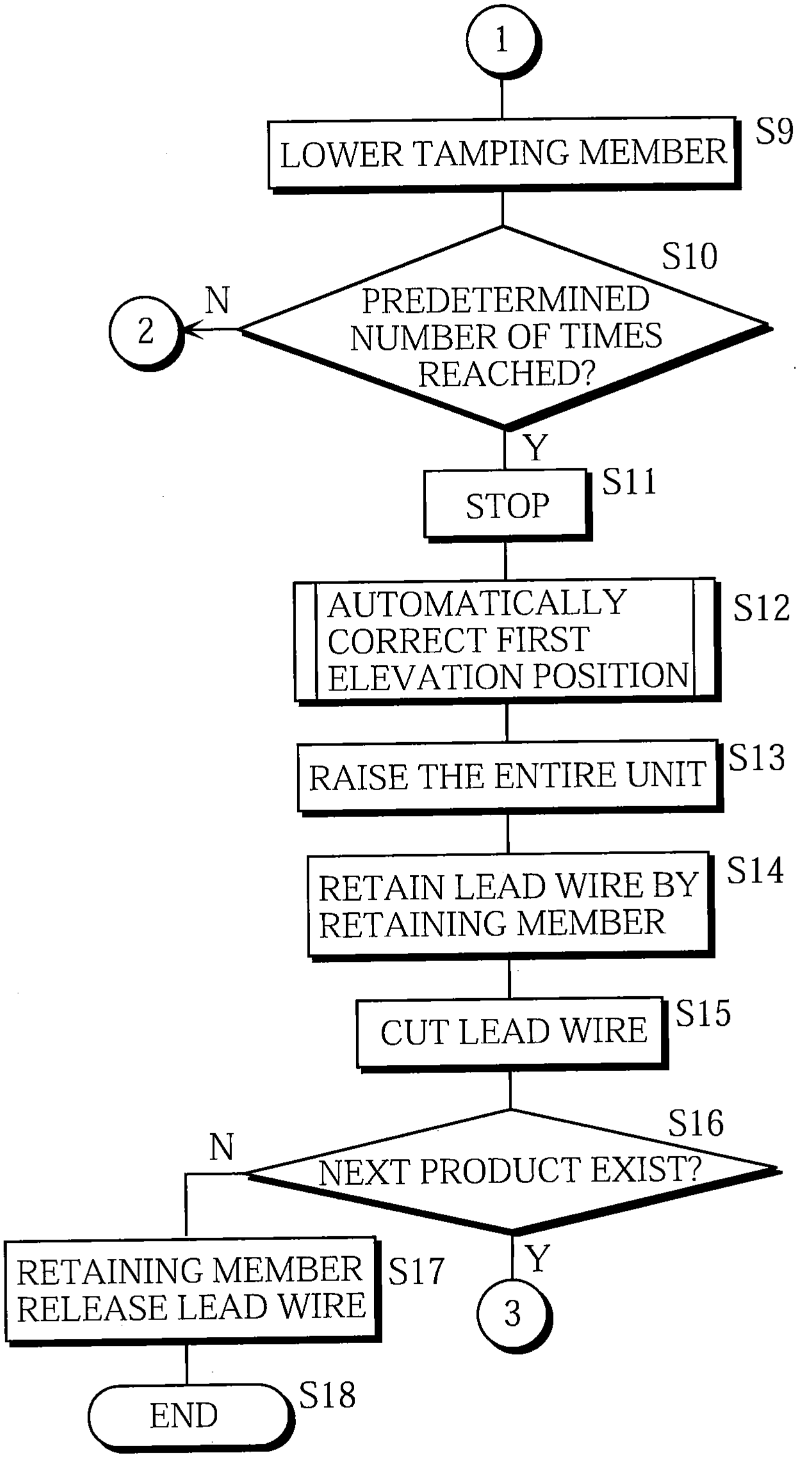
FIG. 5 is a flow-chart for illustrating an implanting operation of the lead wire implanting apparatus according to Embodiment 1.
Figure 6:
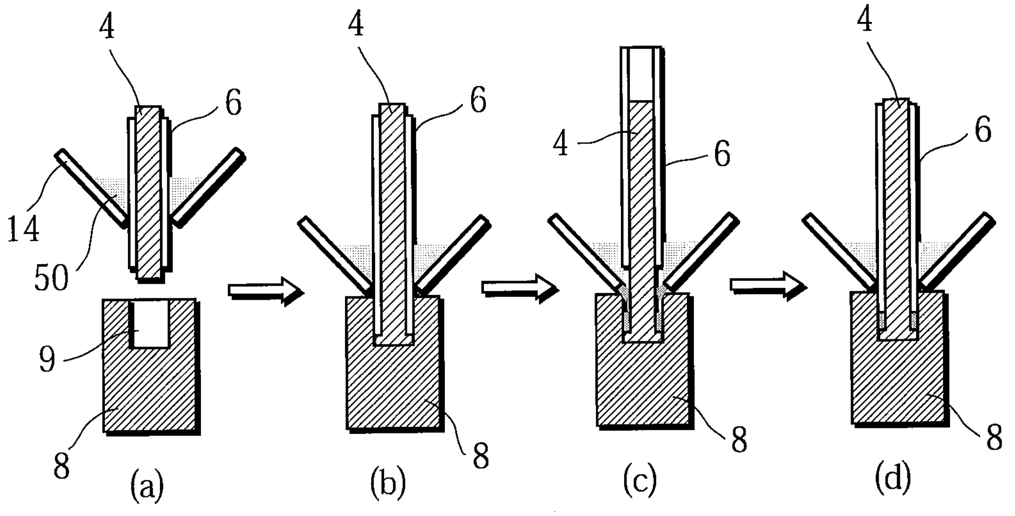
FIG. 6 shows an implanting process according to Embodiment 1.
Figure 7:
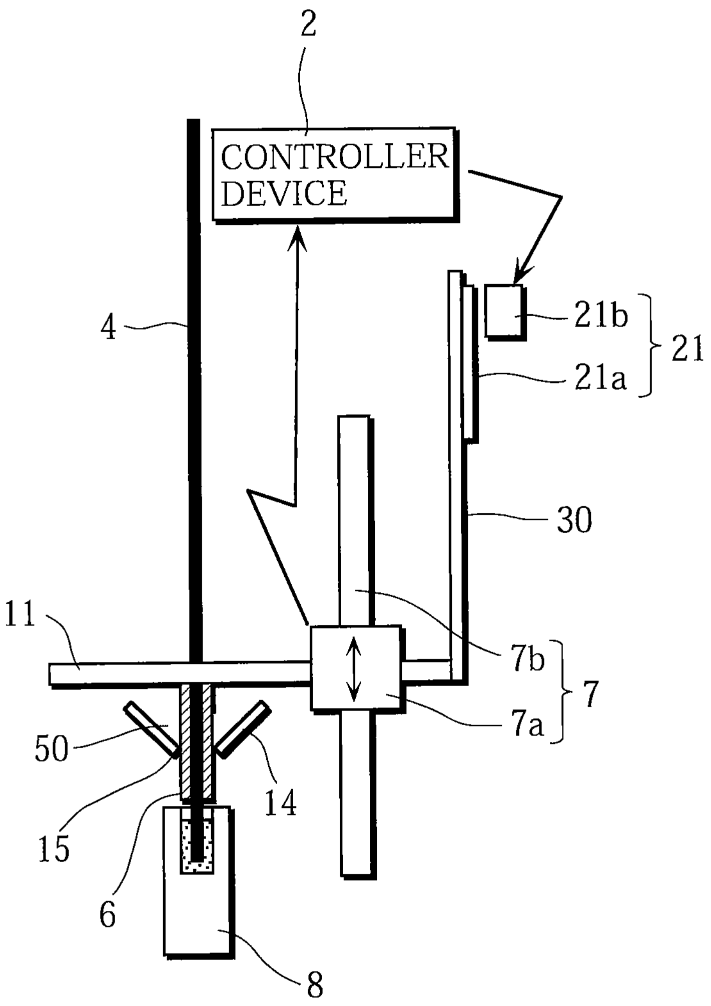
FIG. 7 is a simplified view illustrating the configuration of a lead wire implanting apparatus according to Embodiment 2.
Figure 8:
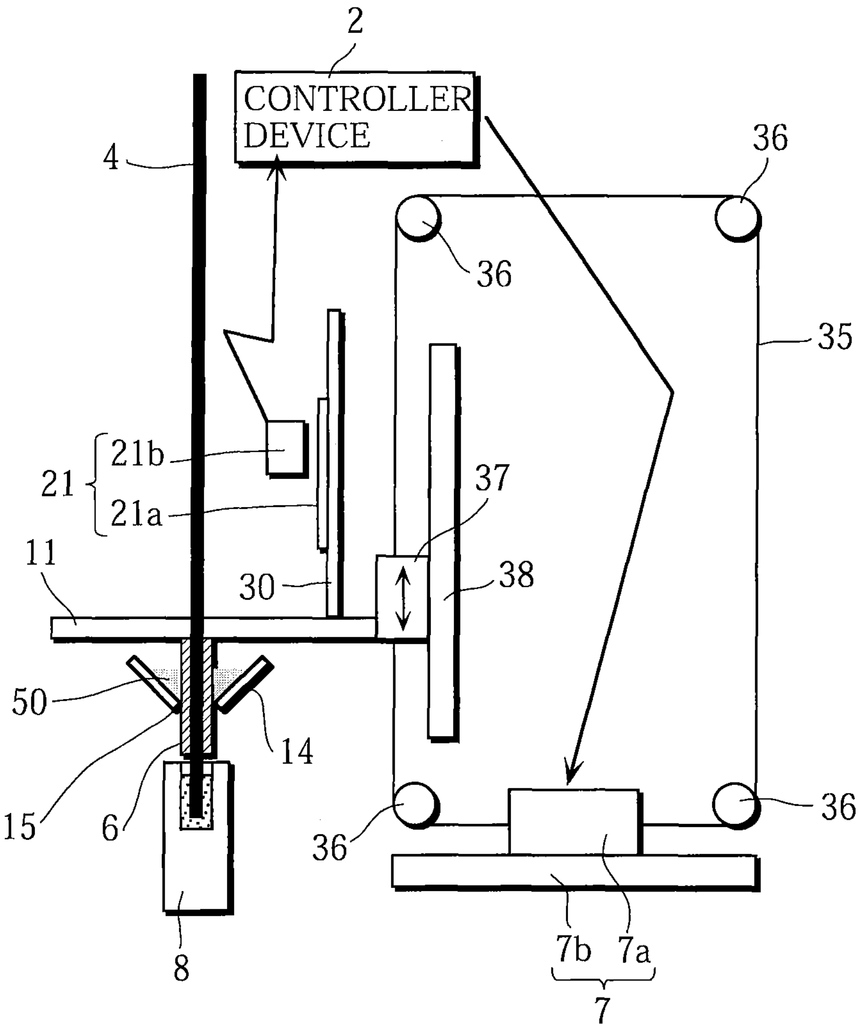
FIG. 8 is a simplified view illustrating the configuration of a lead wire implanting apparatus according to Embodiment 3.
Figure 9:
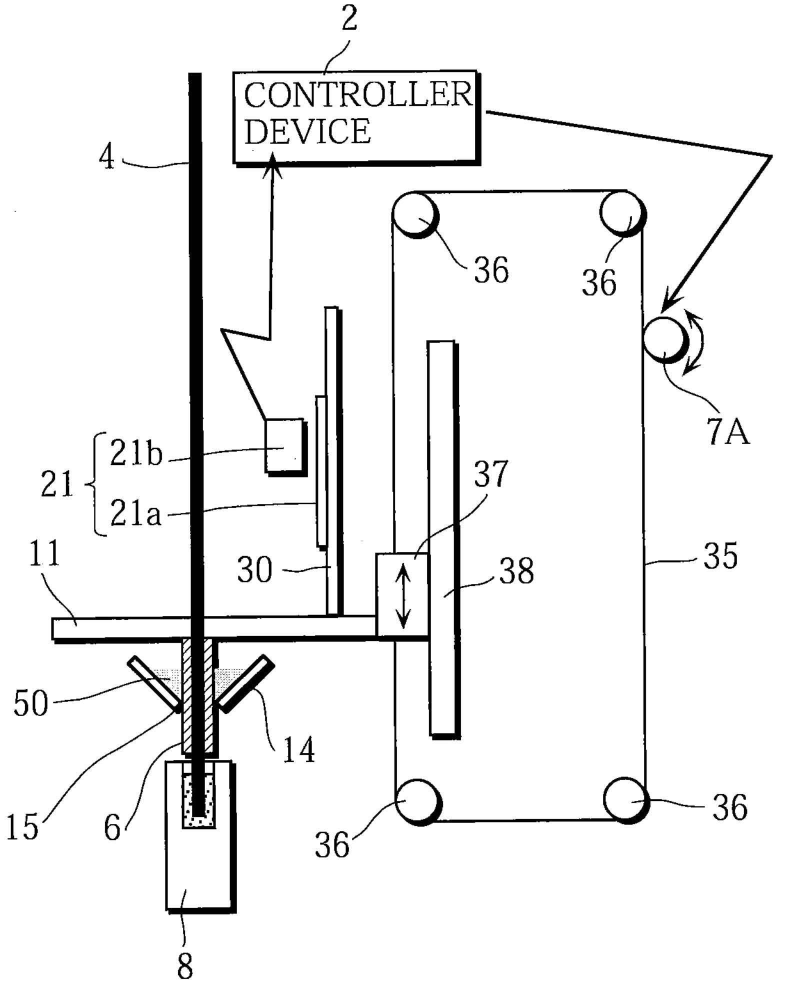
FIG. 9 is a simplified view illustrating the configuration of a lead wire implanting apparatus according to Embodiment 4.
Figure 10:
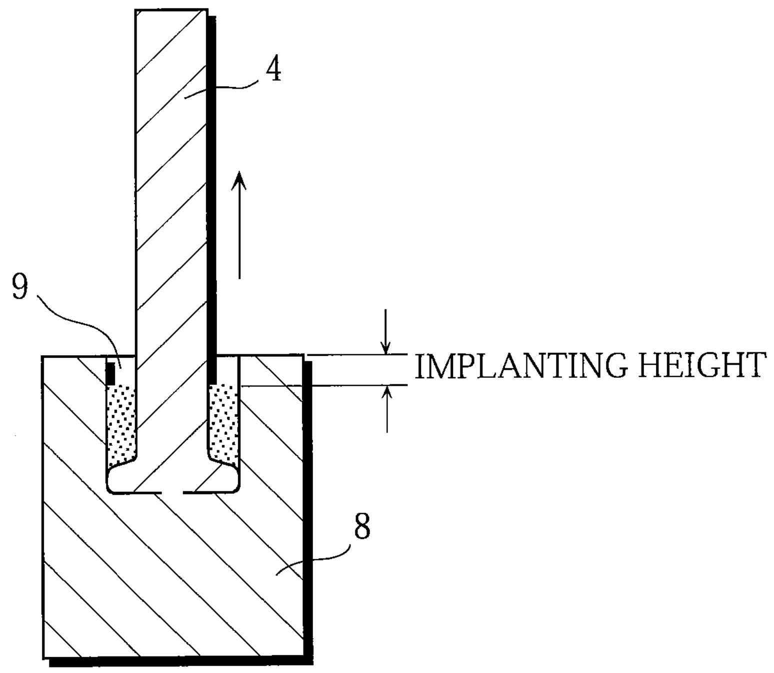
FIG. 10 is an enlarged view of a portion of the brush main body in which the lead wire is implanted.
Figure 11:
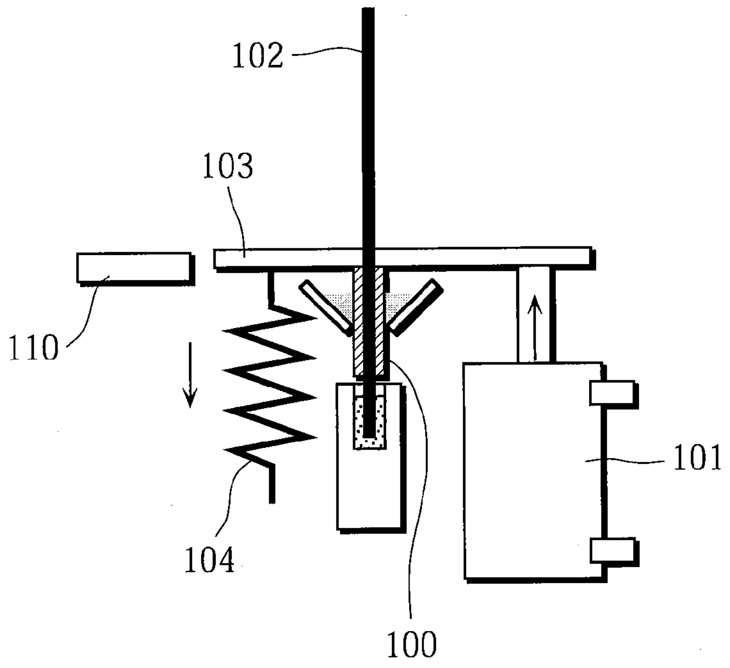
FIG. 11 PRIOR ART
FIG. 11 is a view illustrating the configuration of a conventional example.
Figure 12:
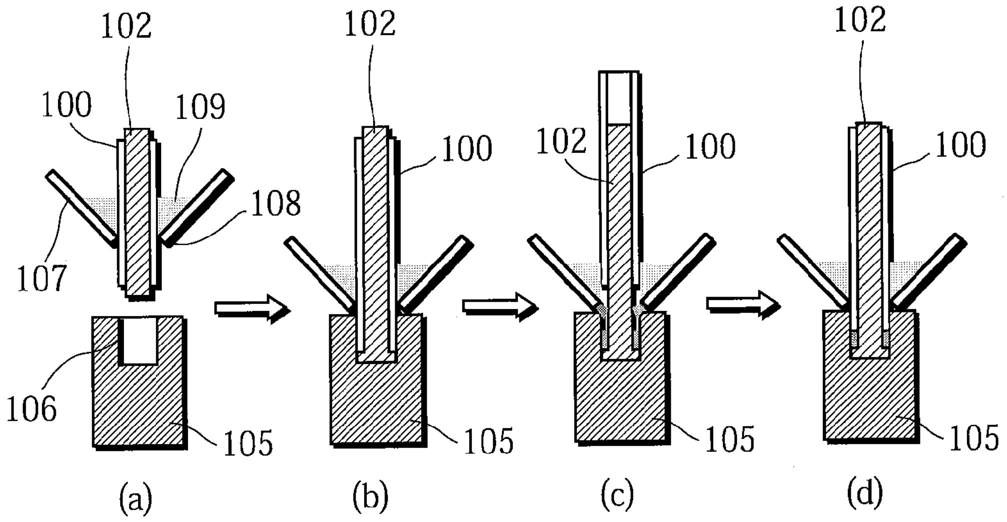
FIG. 12 PRIOR ART
FIG. 12 shows an implanting process according to the conventional example.

| | |
|---|---|
| 1: | implanting device unit |
| 2: | controller device |
| 4: | lead wire |
| 6: | tamping member |
| 7: | linear-type servo motor (first servo motor) |
| 8: | brush main body |

-continued

| | |
|---|---|
| 14: | storing cup |
| 15: | opening |
| 20: | linear motor initial levitating device |
| 21: | first detector |
| 22: | second servo motor |
| 23: | second detector |

The invention claimed is:

1. A lead wire implanting apparatus comprising:

a vertically movable tamping member having a through hole for inserting therethrough a lead wire to be connected to a brush main body; and a storing cup for storing conductive metal powder and having, in a bottom portion thereof, an opening for inserting therethrough the tamping member, the lead wire implanting apparatus configured to: arrange the brush main body at a position below the storing cup so that an implanting hole for implanting therein one end of the lead wire faces upward; after inserting one end of the lead wire into the implanting hole of the brush main body, elevate the tamping member to a first elevation position at which a lower end face of the tamping member is above the opening of the storing cup and drop the conductive metal powder around the lead wire inserted in the implanting hole; subsequently lower the tamping member from the first elevation position to tamp and press-fit the conductive metal powder; and perform the tamping action of the tamping member a predetermined number of times, whereby the lead wire is implanted and fixed to the brush main body, the lead wire implanting apparatus characterized by comprising:

a first servo motor serving as a drive source for driving the tamping member in vertical directions;

a first position detector for detecting a shift position of the tamping member; and controlling means for controlling the first servo motor based on detected information by the first position detector so as to cause the tamping member to perform a predetermined tamping action, wherein the controlling means servo-controls at least a tamping speed and a tamping pressure so as to match preset target values so that the tamping member performs the predetermined tamping action.

2. The lead wire implanting apparatus according to claim 1, wherein the first servo motor is a linear-type servo motor.

3. The lead wire implanting apparatus according to claim 2, wherein the first servo motor is a vertically-mounted linear-type servo motor.

4. The lead wire implanting apparatus according to claim 3, further comprising a linear-type servo motor initial levitating device for levitating a mover of the servo motor during an initial state that is before power to the linear-type servo motor is turned on.

5. The lead wire implanting apparatus according to claim 2, wherein the first servo motor is a horizontally-mounted linear-type servo motor.

6. The lead wire implanting apparatus according to claim 1, wherein the first servo motor is a rotation-type servo motor.

7. The lead wire implanting apparatus according to claim 1, further comprising:

a second servo motor serving as a drive source for driving an entire implanting unit including the tamping member and the storing cup in vertical directions; and a second position detector for detecting a shift position of the implanting unit, and wherein:

the controlling means controls the second servo motor based on detected information from the second position detector in addition to the controlling of the first servo motor, to position the implanting unit to a preset lead wire cutting elevation position.

8. A lead wire implanting apparatus comprising:

a vertically movable tamping member having a through hole for inserting therethrough a lead wire to be connected to a brush main body; and a storing cup for storing conductive metal powder and having, in a bottom portion thereof, an opening for inserting therethrough the tamping member, the lead wire implanting apparatus configured to: arrange the brush main body at a position below the storing cup so that an implanting hole for implanting therein one end of the lead wire faces upward; after inserting one end of the lead wire into the implanting hole of the brush main body, elevate the tamping member to a first elevation position at which a lower end face of the tamping member is above the opening of the storing cup and drop the conductive metal powder around the lead wire inserted in the implanting hole; subsequently lower the tamping member from the first elevation position to tamp and press-fit the conductive metal powder; and perform the tamping action of the tamping member a predetermined number of times, whereby the lead wire is implanted and fixed to the brush main body, the lead wire implanting apparatus characterized by comprising:

a first servo motor serving as a drive source for driving the tamping member in vertical directions;

a first position detector for detecting a shift position of the tamping member; and controlling means for controlling the first servo motor based on detected information by the first position detector so as to cause the tamping member to perform a predetermined tamping action, wherein, if it is detected by the detected information by the first position detector that the height position of the tamping member at the time of completing tamping of the conductive metal powder reaches a preset height position before the number of times of tamping reaches a predetermined number of times, the controlling means changes the elevation position of the tamping member to a second elevation position that is lower than the first elevation position in order to reduce the amount of the conductive metal powder to be dropped, and thereafter controls the tamping action with the second elevation position until the number of times of tamping reaches a predetermined number of times.

9. The lead wire implanting apparatus according to claim 8, wherein the first servo motor is a linear-type servo motor.

10. The lead wire implanting apparatus according to claim 9, wherein the first servo motor is a vertically-mounted linear-type servo motor.

11. The lead wire implanting apparatus according to claim 10, further comprising a linear-type servo motor initial levitating device for levitating a mover of the servo motor during an initial state that is before power to the linear-type servo motor is turned on.

12. The lead wire implanting apparatus according to claim 9, wherein the first servo motor is a horizontally-mounted linear-type servo motor.

13. The lead wire implanting apparatus according to claim 8, further comprising:

a second servo motor serving as a drive source for driving an entire implanting unit including the tamping member and the storing cup in vertical directions; and a second position detector for detecting a shift position of the implanting unit, and wherein:

the controlling means controls the second servo motor based on detected information from the second position detector in addition to the controlling of the first servo motor, to position the implanting unit to a preset lead wire cutting elevation position.

14. A lead wire implanting apparatus comprising:

a vertically movable tamping member having a through hole for inserting therethrough a lead wire to be connected to a brush main body; and a storing cup for storing conductive metal powder and having, in a bottom portion thereof, an opening for inserting therethrough the tamping member, the lead wire implanting apparatus configured to: arrange the brush main body at a position below the storing cup so that an implanting hole for implanting therein one end of the lead wire faces upward; after inserting one end of the lead wire into the implanting hole of the brush main body, elevate the tamping member to a first elevation position at which a lower end face of the tamping member is above the opening of the storing cup and drop the conductive metal powder around the lead wire inserted in the implanting hole; subsequently lower the tamping member from the first elevation position to tamp and press-fit the conductive metal powder; and perform the tamping action of the tamping member a predetermined number of times, whereby the lead wire is implanted and fixed to the brush main body, the lead wire implanting apparatus characterized by comprising:

a first servo motor serving as a drive source for driving the tamping member in vertical directions;

a first position detector for detecting a shift position of the tamping member; and controlling means for controlling the first servo motor based on detected information by the first position detector so as to cause the tamping member to perform a predetermined tamping action, wherein the controlling means obtains a difference between an actually measured value of an implanting height indicating the height position of the conductive metal powder surface at the time of completing tamping and a preset target value, corrects the first elevation position of the tamping member based on the difference, and controls a tamping action for a product to be processed next with the corrected first elevation position.

15. The lead wire implanting apparatus according to claim 14, wherein the first servo motor is a linear-type servo motor.

16. The lead wire implanting apparatus according to claim 15, wherein the first servo motor is a vertically-mounted linear-type servo motor.

17. The lead wire implanting apparatus according to claim 16, further comprising a linear-type servo motor initial levitating device for levitating a mover of the servo motor during an initial state that is before power to the linear-type servo motor is turned on.

18. The lead wire implanting apparatus according to claim 15, wherein the first servo motor is a horizontally-mounted linear-type servo motor.

19. The lead wire implanting apparatus according to claim 14, further comprising:

a second servo motor serving as a drive source for driving an entire implanting unit including the tamping member and the storing cup in vertical directions; and a second position detector for detecting a shift position of the implanting unit, and wherein:

the controlling means controls the second servo motor based on detected information from the second position detector in addition to the controlling of the first servo motor, to position the implanting unit to a preset lead wire cutting elevation position.

* * * * *